United States Patent
Rastoll et al.

(10) Patent No.: US 11,604,468 B2
(45) Date of Patent: Mar. 14, 2023

(54) TECHNIQUES FOR BLENDED CONTROL FOR REMOTE OPERATIONS

(71) Applicant: Valeo Schalter und Sensoren GmbH, Bietigheim-Bissingen (DE)

(72) Inventors: Cyril Rastoll, Palo Alto, CA (US); Sree Harsha Chowdary Gorantla, Sunnyvale, CA (US); Jagdish Bhanushali, Sunnyvale, CA (US)

(73) Assignee: VALEO SCHALTER UND SENSOREN GMBH

( * ) Notice: Subject to any disclaimer, the term of this patent is extended or adjusted under 35 U.S.C. 154(b) by 200 days.

(21) Appl. No.: 16/726,590

(22) Filed: Dec. 24, 2019

(65) Prior Publication Data
US 2021/0191403 A1 Jun. 24, 2021

(51) Int. Cl.
*G05D 1/02* (2020.01)
*G05D 1/00* (2006.01)
*G08G 1/16* (2006.01)

(52) U.S. Cl.
CPC ......... *G05D 1/0214* (2013.01); *G05D 1/0016* (2013.01); *G05D 1/0022* (2013.01); *G05D 1/0061* (2013.01); *G05D 1/0088* (2013.01); *G05D 1/0223* (2013.01); *G08G 1/16* (2013.01); *G05D 2201/0213* (2013.01)

(58) Field of Classification Search
CPC .. G05D 1/0214; G05D 1/0223; G05D 1/0061; G05D 1/0016; G05D 1/0022; G05D 1/0088; G05D 2201/0213; G05D 1/0038; G08G 1/16
See application file for complete search history.

(56) References Cited

U.S. PATENT DOCUMENTS

| | | | |
|---|---|---|---|
| 9,507,346 B1 | 11/2016 | Levinson et al. | |
| 9,874,871 B1 | 1/2018 | Zhu et al. | |
| 10,248,119 B2 | 4/2019 | Kentley-Klay et al. | |
| 10,401,852 B2 | 9/2019 | Levinson et al. | |
| 11,079,753 B1 * | 8/2021 | Roy | G05D 1/0278 |

(Continued)

FOREIGN PATENT DOCUMENTS

| | | |
|---|---|---|
| EP | 2677384 | 12/2013 |
| JP | 2011051547 A * | 3/2011 |

*Primary Examiner* — Jess Whittington
*Assistant Examiner* — Brian E Yang
(74) *Attorney, Agent, or Firm* — Weaver Austin Villeneuve & Sampson LLP

(57) ABSTRACT

Methods, systems, computer-readable media, and apparatuses for blended control of remote operation of vehicles are presented. The sensors of automated vehicles can detect conditions for which there is no preprogrammed response. In these situations, automated vehicles can engage a remote operator mode. Remote operation of vehicles can be difficult. These techniques can use the automated driving system of the vehicle to monitor the driving commands from a remote operator and the sensor information of the vehicle. The commands from the remote operator can be analyzed by a supervision module in the automated vehicle. The supervision module can also receive vehicle sensor information. The supervision module can correct or adjust the remote operator commands as necessary to avoid collision, dampen remote operator induced oscillations, and provide for a smoother, safer, and more realistic driving experience.

18 Claims, 8 Drawing Sheets

(56) References Cited

U.S. PATENT DOCUMENTS

| | | |
|---|---|---|
| 2016/0139594 A1 | 5/2016 | Okumura et al. |
| 2017/0192423 A1 | 7/2017 | Rust et al. |
| 2018/0178791 A1 | 6/2018 | Zhu |
| 2018/0224850 A1 | 8/2018 | Kroop et al. |
| 2020/0064825 A1* | 2/2020 | Woodley ............ B62D 15/0285 |
| 2021/0191387 A1* | 6/2021 | Gunter ................ G05D 1/0038 |
| 2021/0191427 A1* | 6/2021 | Gunter ................ G05D 1/0891 |

\* cited by examiner

TECHNIQUES FOR BLENDED CONTROL FOR REMOTE OPERATIONS

FIELD

The present disclosure relates generally to techniques for semi-autonomous vehicle operation. Specifically the techniques concern blended control for remote vehicle operations.

BACKGROUND

The National Highway Traffic Safety Administration provides for six different levels of vehicle automation. In Level 0, the driver is in complete control of the vehicle and the system does not interfere with driving. In Level 1 (driver assistance), the driver is in control of the vehicle, but the system can modify the speed and steering direction of the vehicle. In Level 2 (partial automation), the driver must be able to control the vehicle if corrections are necessary, but the driver is no longer in control of the speed and steering of the vehicle. In Level 3 (conditional automation), the system is in complete control of vehicle functions such as speed, steering, and monitoring the environment under specific conditions (e.g., fenced-off highway with no intersections). In Level 3, a human driver must be able to intervene when requested by the system to do so. In Level 4 (high automation), the system is in complete control and human presence is no longer needed, but its applications are limited to specific conditions. In Level 5 (full automation), the system is capable of providing the same aspects as Level 4, but the system can operate in all driving conditions. Automated vehicles employ an advanced driver assistance system (ADAS). The ADAS is a collection of sensors, controls, transmitter/receivers, computer systems, and software that collectively perform the operations of the automated vehicle.

Automated vehicles are sometimes confronting unknown or unexpected situations that the programming cannot handle. This can be due to significant changes in the infrastructure or obstacles such as working zone, accidents, law enforcement activities, acts of nature (e.g., fallen trees in roadway). In those situations, the automated vehicle may not be able to understand the situation and therefore may not be able to make decisions on the correct path.

Fully-automated vehicles (ADAS level 4 and 5) do not have a driver to assist with the unknown situation. To handle those situations, one strategy automated vehicles implement is to remotely control the vehicle, by remotely updating the vehicle's trajectory by designating a series of waypoints or by manually controlling the steering, throttle and brakes of the vehicle through a remote interface. In the case of trajectory update, the remote operator would evaluate the vehicle surrounding and define a new trajectory/path for the vehicle to drive in automated mode. On the other hand, manually remotely driving the vehicle can be done by providing the full control of the vehicle actuation to the remote operator. The remote operator would then drive the vehicle using cameras and other sensor data.

The trajectory update method has limitations because it relies on a very detailed understanding of the surrounding. This is often not the case. Most of the time, the working zone can be long and extremely complex and the full scenario may not be visible from the start. In that case, the automated vehicle may have to request help from the remote operator multiple times. Moreover, the trajectory update method may need to rely heavily on updated high-definition maps. These maps may not exist or if they do, they may not be accessible by the remote operator, especially in the case of a working zone.

Remote operator driving the vehicle can better handle complex and longer scenarios. However, this remote operation can be challenging at higher speeds due to network reliability and difficulty to perceive the right information while driving. Driving a vehicle through a video stream (including using three-dimensional (3D) visualization) is a complex task due to various factors, including but not limited to restricted field of view for the remote driver, limited realistic feedback to the remote operator, lack of complete situational awareness, and system latency. Even simulators and other remote operation cockpits cannot replicate the feeling of a real car due to the lack of motion detected in the vestibular system of the driver. Further, driver induced oscillations may occur when the remote driver inadvertently commands an often increasing series of corrections in opposite directions, each an attempt to cover the vehicle's reaction to the previous input with an over correction in the opposite direction.

BRIEF SUMMARY

Certain embodiments are directed to techniques (e.g., a device, a method, a memory or non-transitory computer readable medium storing code or instructions executable by one or more processors) for implementing blended control during remote vehicle operations.

In some embodiments, one or more computing devices may receive sensor information relating to a vehicle environment. The sensor information may be received via a wireless link. The received sensor information can be based on signals generated by one or more sensors. In various embodiments, the sensors can be non-camera sensors (e.g., one or more ultrasonic sensors, one or more radar sensors, and/or one or more light detection and ranging (LIDAR) sensors) coupled to a vehicle. Depending on the implementation, the received sensor information may include raw sensor data or processed sensor data.

In some embodiments, the one or more computing devices may combine the received sensor information to generate a composite mapping of the vehicle environment. Thereafter, the one or more computing devices may receive input for maneuvering the vehicle according to the composite mapping.

The one or more computing devices may generate a first set of one or more signals for causing the vehicle to be remotely maneuvered within the vehicle environment based on the received sensor information. The first set of one or more signals may be communicated from the one or more computing devices to the vehicle, thereby causing the vehicle to be remotely maneuvered within proximity of a vehicle location. The automatic braking features of the vehicle can be configured to automatically perform braking to avoid hitting an object while maneuvering.

To overcome the challenges associated with remote vehicle operations, the techniques can use the automated driving system to monitor the driving commands from the remote operator and the sensor information of the vehicle. If necessary, the automated driving system can correct or adjust the instructions provided to the vehicle control system to improve safety and provide more realistic control of the vehicle. In some embodiments, the commands from the remote operator are analyzed by a supervision module. The supervision module also receives vehicle sensor information. The supervision module can correct or adjust the remote operator commands as necessary to avoid collision, dampen remote operator induced oscillations, and provide for a smoother and safer experience.

In one aspect, a method can be performed by one or more computing devices for blended control of remote vehicle operation. The technique can include receiving, at a vehicle, first sensor information relating to a driving environment. The received sensor information can be based on first signals generated by a plurality of sensors coupled to a vehicle. The plurality of sensors can include one or more non-camera sensors. The technique can include detecting, at the vehicle, based at least in part on the received first sensor information, a condition that triggers the vehicle to enter a remote operation mode. The technique can include transmitting, from the vehicle, a portion of the received first sensor information over a network to a remote operation system to be used by a remote operator. The technique can include receiving, at the vehicle, one or more second signals from the remote operation system, the one or more second signals provide instructions from the remote operator to remotely operate the vehicle. The technique can include generating, at the vehicle, blended control signals for controlling at least one operation affecting a trajectory of the vehicle, the blended control signals based on the one or more second signals from the remote operator and the second received sensor information. The technique can include using the blended control signals to control the at least one operation affecting the trajectory of the vehicle.

In various embodiments, the generation of blended control signals can include detecting a first commanded speed level by the one or more second signals. The generation of blended control signals can include comparing the first commanded speed level to the received second sensor information. The technique can include detecting a second commanded speed level by the one or more second signals. The generation of blended control signals can include adjusting the commanded speed level to reduce fluctuations between the first commanded speed level and the second commanded speed level.

In various embodiments, the generation of blended control signals can include detecting a commanded steering angle by the one or more second signals. The generation of blended control signals can include comparing the commanded steering angle to a present steering angle and a vehicle velocity from the received sensor information. The generation of blended control signals can include adjusting the commanded steering angle to maintain a steady trajectory.

In various embodiments, the generation of blended control signals can include detecting a distance from one or more obstacles in a vicinity of the vehicle. The generation of blended control signals can include generating one or more steering commands, one or more acceleration commands, and one or more braking commands, to maintain a set distance from the one or more obstacles. The generation of blended control signals can include sending, the one or more steering commands, the one or more acceleration commands, and the one or more braking commands to the vehicle control module.

In various embodiments, the generation of blended control signals can include detecting a distance from a second vehicle within a set distance of the vehicle. The generation of blended control signals can include generating one or more acceleration commands, and one or more braking commands, to maintain a minimum distance from the second vehicle. The generation of blended control signals can include sending the one or more acceleration commands, and the one or more braking commands to the vehicle control module.

In various embodiments, the generation of blended control signals can include detecting one or more of an object, a person or a second vehicle that enters a projected path of the vehicle. The generation of blended control signals can include defining available free space around the vehicle and boundaries around the object, the person, or the second vehicle. The generation of blended control signals can include generating one or more steering commands, one or more acceleration commands, and one or more braking commands, to cause the vehicle to maneuver into the free space around the vehicle and outside the boundaries around the object, the person, or the second vehicle. The generation of blended control signals can include sending, the one or more steering commands, the one or more acceleration commands, and the one or more braking commands to the vehicle control module.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Certain embodiments of the present disclosure relate to devices, computer-readable medium, and methods for implementing various techniques for blended control for remote vehicle operations. The techniques can use the automated driving system of the vehicle to monitor the driving commands from a remote operator and the sensor information of the vehicle. If necessary, the automated driving system can correct or adjust the instructions provided to the vehicle control system to improve safety and provide more realistic control of the vehicle. In some embodiments, the commands from the remote operator are analyzed by a supervision module. The supervision module also receives vehicle sensor information. The supervision module can correct or adjust the remote operator commands as necessary to avoid collision, dampen remote operator induced oscillations, and provide for a smoother and safer experience.

I. System Overview

Figure 1:
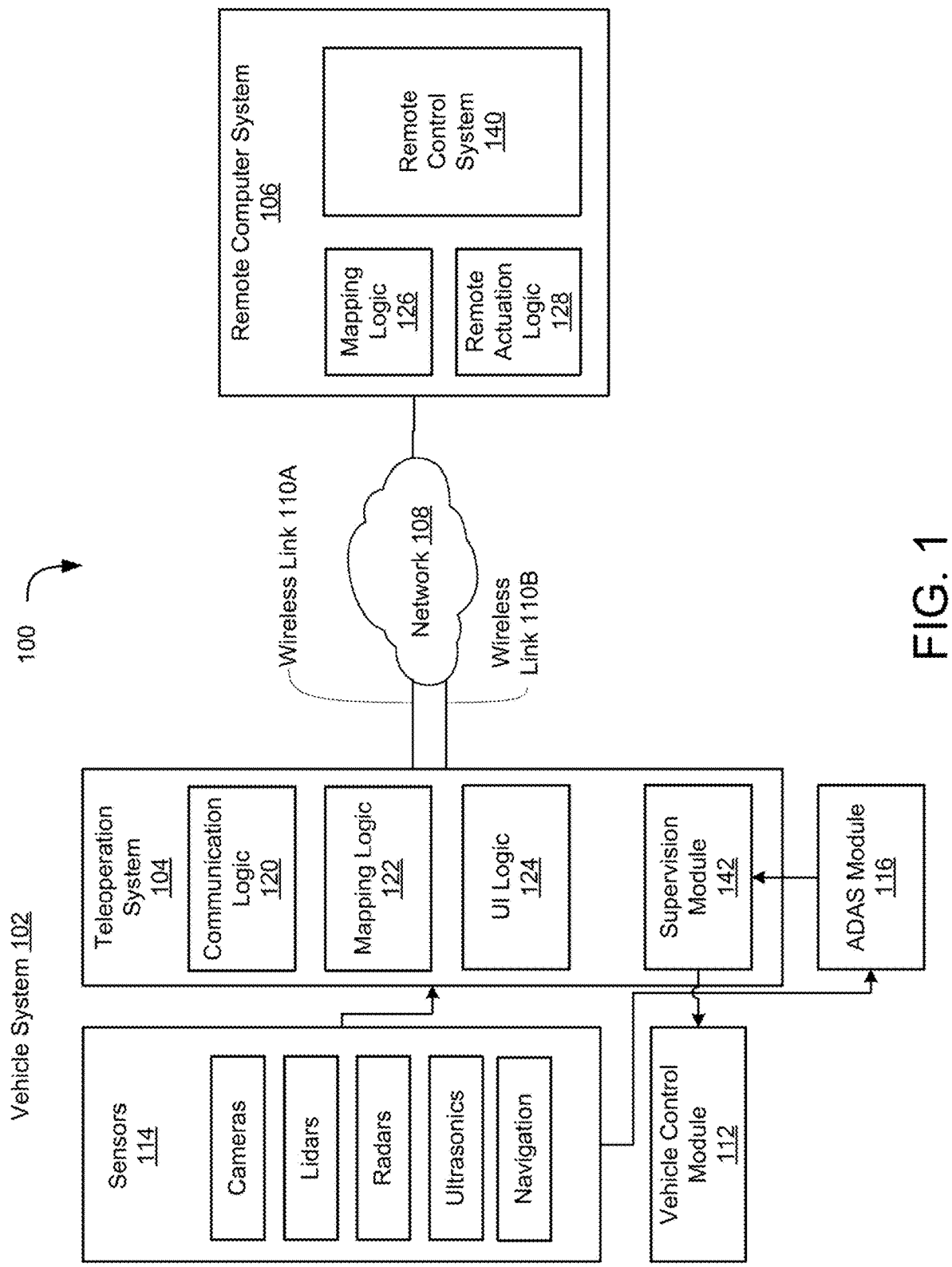
FIG. 1 illustrates an example computing environment that may incorporate one or more embodiments.

FIG. 1 illustrates a computing environment 100 that may incorporate one or more embodiments. It should be appreciated that FIG. 1 is merely provided as an example and that other configurations are contemplated to be within the scope of the disclosure. For example, one or more components may be omitted from FIG. 1, rearranged in FIG. 1, consolidated with another component illustrated in FIG. 1, distributed across multiple systems illustrated in FIG. 1, and/or added to FIG. 1 without departing from the scope of the disclosure or the spirit of the appended claims.

In the example of FIG. 1, computing environment 100 comprises a vehicle system 102, computing systems 104 and 106, and vehicle control module 112.

A. Vehicle System 102

Vehicle system 102 may be a car, truck, van, bus, boat, plane, or some other transportation mechanism. In the example of FIG. 1, vehicle system 102 comprises a vehicle control module 112, a plurality of sensors 114, and an advanced driver-assistance system (ADAS) module 116.

The vehicle control module 112 can include multiple electronic control units (ECUs). ECUs may comprise any number of embedded systems that each control one or more electrical systems or subsystems of vehicle system 102. Examples of ECUs may include, without limitation, an engine control unit, a power steering control unit, a powertrain control module, a speed control unit, a telematics control unit, a transmission control unit, and/or a brake control module. Collectively, ECUs may be referred to as the vehicle control module 112 or "the vehicle computer" of vehicle system 102.

Sensors 114 may comprise any number of various devices that provide information relating to vehicle system 102 and/or an environment external to vehicle system 102. Examples of sensors 114 may include, without limitation, one or more cameras, one or more microphones, one or more radar sensors, one or more ultrasonic sensors, one or more light detection and ranging (LIDAR) sensors, one or more navigation sensors (e.g., a global positioning system (GPS) sensor), a steering angle sensor, one or more accelerometers, and/or one or more motion sensors. Sensors are described in detail below with reference to FIG. 2.

B. Teleoperation System 104

Teleoperation system 104 may comprise one or more computing devices that, among other things, facilitate communication between vehicle system 102 and remote computer system 106. In FIG. 1, teleoperation system 104 is communicatively coupled to but separate from vehicle system 102. For example, teleoperation system 104 may be an "aftermarket" device specially configured to interface with particular vehicle makes and/or models. However, in some embodiments, teleoperation system 104 may be a component of vehicle system 102. For example, teleoperation system 104 may be built into vehicle system 102 by the vehicle manufacturer.

Teleoperation system 104 may comprise one or more processors and a non-transitory computer-readable storage medium containing processor-executable instructions. Examples of the instructions may include, without limitation, communication logic 120, mapping logic 122, user interface (UI) logic 124, and supervision logic 142. Each of these example logics is described below.

As illustrated in FIG. 1, teleoperation system 104 may be communicatively coupled to remote computer system 106 via a network 108. Network 108 may comprise one or more communication networks. Example communication networks may include, without limitation, the Internet, a wide area network (WAN), a local area network (LAN), a public network, a private network, a wired network, and/or a wireless network. Due to the mobile nature of vehicle system 102, teleoperation system 104 typically connects to network 108 via one or more wireless links, such as wireless links 110A-B. Wireless links 110A-B may comprise a cellular network connection, a Wi-Fi network connection, a Bluetooth network connection, and/or any other network connection based on a radio frequency communication protocol.

However, the latency and/or bandwidth of a wireless link may vary significantly from one moment to another and/or from one location to another. This can be problematic when remotely operating a vehicle because even the smallest amount of delay can result in a collision. Accordingly, teleoperation system 104 may comprise a set of instructions (e.g., communication logic 120) that establishes and concurrently maintains multiple wireless network connections for communicating with remote computer system 106. For example, wireless link 110A may be a cellular network connection, and wireless link 110B may be a Wi-Fi network connection. Although only two different wireless links are illustrated in FIG. 1, it should be appreciated that teleoperation system 104 may establish and concurrently maintain any number of wireless links over one or more different protocols.

In some embodiments, communication logic 120 may monitor each wireless link and enable communication via the wireless link exhibiting the lowest latency and/or greatest bandwidth at a particular point in time. For example, if wireless link 110A exhibits lower latency than wireless link 110B at time T1, then teleoperation system 104 may communicate via wireless link 110A and not wireless link 110B; however, if wireless link 110A exhibits higher latency than wireless link 110B at time T2, then teleoperation system 104 may communicate via wireless link 110B and not wireless link 110A. The quantity of data transmitted may also be degraded as necessary. For example, the resolution level of visual data may be lowered when latency is high and/or bandwidth is small.

In some other embodiments, communication logic 120 may enable communication via multiple wireless links for redundancy. For example, teleoperation system 104 may communicate the same message via each of wireless links 110A-B.

Among other things, teleoperation system 104 may communicate data from sensors 114 to remote computer system 106 via one or more wireless links. The communicated data may comprise raw sensor data and/or processed sensor data. In some embodiments, processed sensor data may comprise an aggregated camera view of vehicle system 102 and/or its surroundings. The aggregated camera view may be generated by a set of instructions (e.g., mapping logic 122) that stitch together images from multiple camera angles (e.g., from the front, back, and sides of vehicle system 102).

Depending on the processing capabilities of teleoperation system 104, in some embodiments, mapping logic 122 may also perform many, if not all, of the functions of mapping logic 126. In such embodiments, it may be unnecessary to execute some or all of mapping logic 126 at remote computer system 106.

UI logic 124 may comprise a set of instructions that facilitates interaction between a user (e.g., the driver of vehicle system 102) and teleoperation system 104, which may, in turn, serve as an intermediary between the user and remote computer system 106. For example, teleoperation system 104 may be operatively coupled to an output device (e.g., a display device that can be mounted on a dashboard), an input device (e.g., a push button that can be mounted in a rear-view mirror or a dashboard), or a combination thereof (e.g., a microphone and speaker system). Thus, UI logic 124 may comprise instructions for processing data sent to/received from an output/input device.

C. Supervision Module 142

The teleoperation system 104 can also include a supervision module 142. Operation of the supervision module 142 is briefly described here, and more detail is also provided later with reference to FIG. 3. A purpose of the supervision module 142 is to receive the control inputs received from the remote operator, various automated driving functions from the ADAS module 116 and one or more sensors via the teleoperation system 104 to deliver smooth, safe control inputs to the vehicle control module 112. The supervision module 142 can monitor the control inputs received from a remote control system 140 via the remote computer system 106 and through the communication logic 120 of the teleoperation system 104. The supervision module 142 can receive sensor information from one or more of the sensors 114. For example, the supervision module 142 may receive speed information from a velocity sensor. The ADAS module 116 can also receive sensor information from one or more of the sensors 114. For example, the ADAS module 116 can receive velocity information from the sensors 114 for use in cruise control features. The supervision module 142 can also receive commands from the remote control system 140 from a remote operator.

The supervision module 142 can produce blended remote control signals, which can be used to smooth the action of the remote driver. It can be difficult for the remote operator to keep a straight trajectory or not to accelerate/brake too hard. This can be more prominent due the system latency and the lack of real-time realistic feedback. In those cases, the supervision module 142 can remove any small fluctuation from the steering angle and smooth acceleration and braking control inputs.

The blended remote control signals from the supervision module 142 can be used to adjust trajectory to stay within the boundary detected by sensor fusion. Driving using video streams can be challenging because it is difficult to estimate the distance to object or borders. The remote operator may inadvertently drive too close to parked cars or may inadvertently cross lane divider markings. The sensors 114 can detect lines/lanes, road boundary and free space using raw and processed sensor information, and the ADAS module 116 can provide control inputs to correct the trajectory provided by the remote operator to prevent collision or maintain smooth control of the vehicle.

The blended remote control signals can be used to adjust the speed and keep safety distance by using sensor fusion. As mentioned above, it can be difficult for the remote driver to accurately estimate the distance to an object such as other vehicles on the roadway. If the remote driver does not keep a safe distance, the system can provide control inputs via the ADAS module 116 to adjust the remote driver control inputs.

The blended remote control signals can be used to avoid collision by changing path/trajectory. It can be difficult for the remote driver to detect object/pedestrian/vehicle crossing the road unexpectedly. The sensors 114 can detect the object without delay (e.g. system latency and human reaction time), work with the mapping logic 122 and the ADAS module 116 to define the available free space around the vehicle, establish boundaries, and predict a safe path for the vehicle to travel in order to avoid an object. If the remote operator does not steer the wheel to prevent the collision, the system can provide control inputs to adjust the vehicle trajectory to do so.

For example, a remote operator should be able to verify a small corrections made by the ADAS Module 116 through the supervision module 142. If the correction is minimal and does violate control logic restraints, for instance small correction of trajectory to stay in the center of the lane, the corrected driving instructions can be directly sent to the vehicle control module 112. The remote operator can receive haptic feedback of the control input correction.

However, if the correction is due to an emergency where the vehicle is going to hit an obstacle without the correction, then the correction can be directly applied. The remote operator can also get the haptic feedback. For example, the system can apply emergency braking to avoid a collision with a pedestrian.

In some embodiments, if the correction is significant but not critical or urgent, the remote operator will be asked to confirm if he/she accepts the correction. For instance, if the correction is to adjust the speed to increase safety distance and make sure a more stable speed can be maintained, the remote operator can first be queried to accept or reject the correction prior to application.

D. Advanced Driver-Assistance System/Automated Driving (ADAS/AD) Module 116

The ADAS/AD can comprise one or more computing devices that provide for vehicle control. In some embodiments, the ADAS/AD can be one or more logic routines resident on the one or more computing devices of the vehicle system 102. The ADAS/AD module 116 can provide for a number of advanced driver-assistance functions. These functions can include but are not limited to lane centering, automated braking, adaptive cruise control, intelligent speed adaptation, lane change assistance, blind spot detection, freespace, and trajectory parking.

Lane centering assist is a Level 2 automated driving technology that helps a driver keep a vehicle centered in the middle of the intended lane of travel. Lane warning/keeping systems can be based on data from video sensors in the visual domain (mounted behind the windshield, typically integrated beside the rear mirror), or laser sensors (mounted on the front of the vehicle), or infrared sensors (mounted either behind the windshield or under the vehicle) or any combination thereof. The lane centering assist can apply mild steering torque if the vehicle is deviating from the center of a detected lane with no turn-signal activation by the driver.

Automatic braking feature may comprise hardware (e.g., an actuator) and/or software (e.g., an algorithm) that enable collision avoidance. More specifically, collisions may be avoided based on automated application of brakes when an object is detected in a predicted travel path (e.g., a straight/angled forward travel path or a straight/angled reverse travel path). In some embodiments, automatic braking feature may comprise a set of instructions that coordinate between one or more ECUs (e.g., a brake control module) or the vehicle control module 112 and one or more sensors 114 (e.g., a camera, a radar sensor, an ultrasonic sensor, and/or a LIDAR sensor).

Adaptive cruise control (ACC) can be a feature for road vehicles that automatically adjusts the vehicle speed to maintain a safe distance from vehicles ahead. Adaptive cruise control can also be known as dynamic cruise control. Adaptive Cruise Control can be based on sensor information from on-board vehicle sensors 114. Such sensors 114 may use a radar or laser sensor or a camera setup allowing the vehicle to brake when it detects the car is approaching another vehicle ahead, and then accelerate when traffic allows it to.

ACC technology can affect driver safety and convenience as well as increasing capacity of roads by maintaining optimal separation between vehicles and reducing driver errors.

Lane change assistance features provide warnings if vehicles are in a vehicle's blind spots. The lane change assistance feature can receive information from the sensors 114. The sensors 114 can monitor the area alongside and behind the car. Lane change assistance control software routines collates the sensor information to create a complete picture of all traffic in the area behind the vehicle. Whenever another vehicle approaches at speed from behind or is already present in the blind spot, a signal such as a warning light in the side mirror alerts the driver to the hazard. Should the driver still activate the turn signal with the intention of changing lanes, the system issues an additional acoustic and/or haptic warning.

Blind Spot Detection features provide warnings when vehicles, pedestrians, or obstacles enter into the blind spot of the vehicle. The sensors 114 can monitor vehicles blind spots on the sides and rear of the vehicle. The blind spot detection features can provide warnings that can be visible, aural, or haptic. Blind spot detection features can also detect cross traffic alerts that can provide warning when traffic is approaching from both sides.

A free space detection feature detects obstacle-free areas or free space along the trajectory of the vehicle. Information from one or more sensors 114 (e.g., front-facing sensor cameras on the vehicle) capture images of whatever is ahead of the vehicle. Those images can be analyzed by a computer vision system to find aspects such as where is the roadway, where are objects, and the like. An automated system can determine areas of free space around and ahead of the vehicle. In this way, if an automated vehicle needs to suddenly swerve to avoid something, it will know areas of free space to use.

A trajectory planning is used to safely maneuver an automated vehicle along a pre-planned path. Trajectory planning can use one or more waypoints and the vehicle can be programmed to proceed sequentially to the waypoints along the route. Features can allow the trajectory to be changed or modified along the route.

E. Remote Computer System 106

Remote computer system 106 may comprise one or more computing devices that facilitate remote operation of vehicle system 102. As used herein, the term "remote" refers to separation by at least one wireless link from a vehicle system, such as vehicle system 102. For example, in FIG. 1, remote computer system 106 is separated from vehicle system 102 by network 108 and wireless link 110A/B.

Remote computer system 106 may comprise one or more processors and a non-transitory computer-readable storage medium containing processor-executable instructions. Examples of the instructions may include, without limitation, mapping logic 126, and remote actuation logic 128. Each of these example logics is described below.

Mapping logic 126 may comprise a set of instructions that combine data from different types of sensors 114. The combined sensor data may be used to generate a composite mapping of an environment external to vehicle system 102. For example, signals generated by cameras, ultrasonic sensors, radar sensors, and LIDAR sensors may be used to generate a composite mapping that includes such metrics as distances to objects and speeds of the objects. Composite mappings are described in detail below with reference to FIG. 3. Remote actuation logic 128 may comprise a set of instructions that translate vehicle control input obtained from a remote operator into a format suitable for transmission to and/or use by a module (e.g., supervision module 142) at the vehicle system 102.

F. Vehicle Control Module 112

Vehicle control module 112 is located in the automated vehicle and receives one or more control signals from the supervision module 142. The vehicle control module 112 translated the one or more control signals into movement of the wheels or steering wheel, movement of the brakes or movement of the accelerator. The vehicle control module can convert the one or more electrical control signals into movement of one or more actuators or other mechanical devices to move the vehicle.

II. Sensor System

Figure 2:
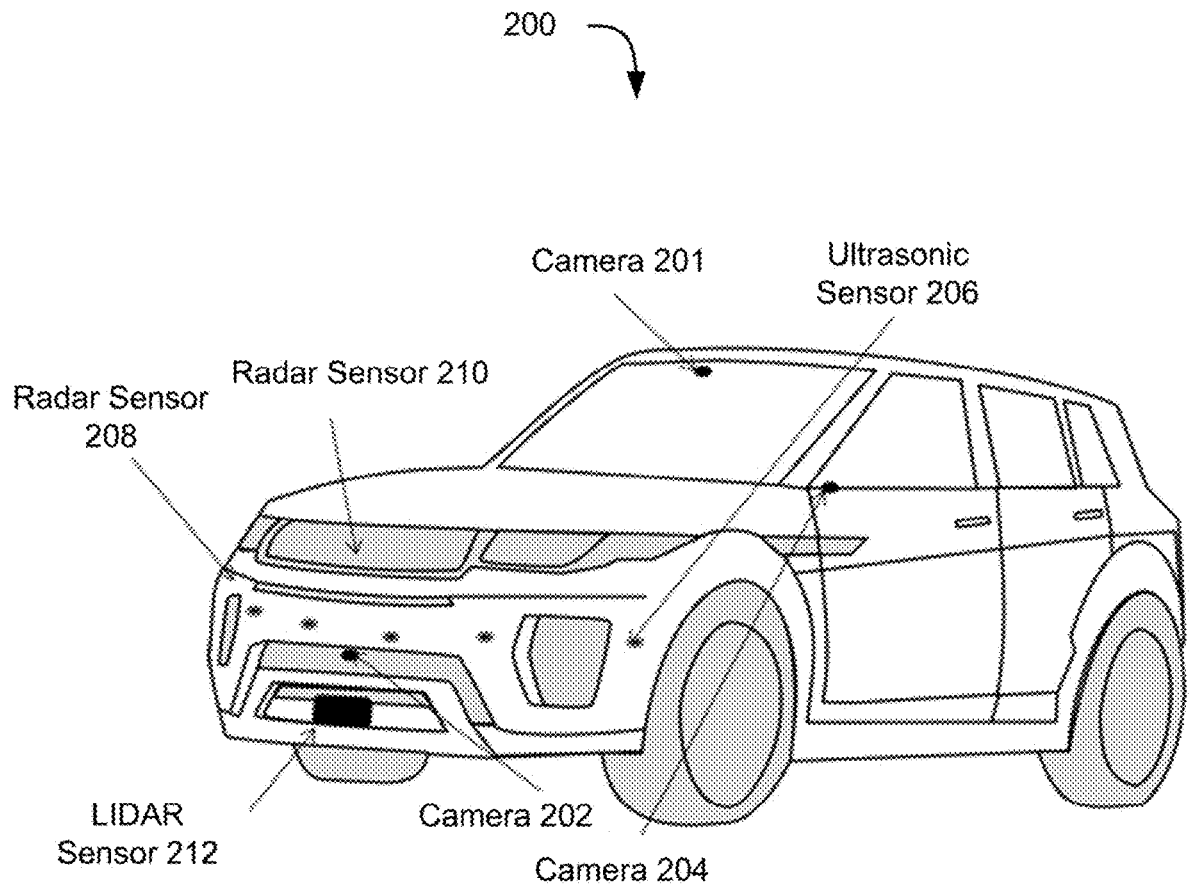
FIG. 2 illustrates an example vehicle system comprising a plurality of sensors.

FIG. 2 illustrates a front-left perspective view of vehicle system 102 comprising an example configuration of sensors. It should be appreciated that FIG. 2 is merely provided as an example and that other configurations (e.g., configurations comprising sensors not illustrated in FIG. 2) are contemplated to be within the scope of the disclosure. For example, one or more sensors may be omitted from FIG. 2, placed at another location in FIG. 2, consolidated with another sensor illustrated in FIG. 2, and/or added to FIG. 2 without departing from the scope of the disclosure or the spirit of the appended claims.

In the example of FIG. 2, vehicle system 200 comprises a plurality of sensors coupled to a vehicle. The plurality of sensors comprise cameras 201, 202, 204, ultrasonic sensor 206, radar sensors 208 and 210, and LIDAR sensor 212. Each of these sensors may generate signals that can provide information relating to vehicle system 102 and/or an environment external to vehicle system 102.

Cameras 202, 204 may be used to provide visual information relating to vehicle system 102 and/or its surroundings. Cameras 202, 204 may comprise a wide-angle lens, such as a fisheye lens that can provide, for example, a 190-degree angle of view. Multiple cameras may provide multiple views that can be stitched together to form an aggregate view. For example, cameras located at each side of a vehicle can be stitched together to form a 360-degree view of the vehicle and/or its environment. In some embodiments, the 360-degree view may be provided from a perspective looking down on the vehicle at a 45-degree angle. This perspective may be similar to those used in video games for facilitating control of a vehicle.

FIG. 2 illustrates a row of ultrasonic sensors across the front bumper of the vehicle. The row of ultrasonic sensors includes ultrasonic sensor 206, which is an example of a sensor located at a corner of the front bumper. The ultrasonic sensors may use ultrasonic waves to detect objects (e.g., people, structures, and/or other vehicles) in an environment external to the vehicle. In some embodiments, the ultrasonic sensors may also use ultrasonic waves to determine speeds and/or positions (including distances) of the objects relative to the vehicle.

Radar sensors, such as radar sensors 208 and 210, may use radio waves to detect objects (e.g., people, structures, and/or other vehicles) in an environment external to the vehicle. In some embodiments, the radar sensors may also use radio waves to determine speeds and/or positions (including distances) of the objects relative to the vehicle. Referring to FIG. 2, radar sensor 208 is an example of a sensor located at a corner of the front bumper, and radar sensor 210 is located on the front fascia of the vehicle.

Lidar sensors, such as LIDAR sensor 212, may use any type of laser light to detect objects (e.g., people, structures, and/or other vehicles) in an environment external to the vehicle. In some embodiments, the LIDAR sensors may also use infrared laser light to determine speeds and/or positions (including distances) of the objects relative to the vehicle. In the example of FIG. 2, LIDAR sensor 212 is located toward a bottom portion of the vehicle. However, the LIDAR sensor can be located anywhere on the vehicle without departing from the teachings of present disclosure.

Although a rear-right perspective view of vehicle system 102 is not shown in FIG. 2, it should be appreciated that such a view may comprise a similar configuration of sensors. For example, cameras may be located near the upper edge of the rear window, near the center of the rear bumper, and/or on the right-side mirror of the vehicle; a row of ultrasonic sensors may be located across the rear bumper, including the corners; radar sensors may be located on the rear fascia and bumper corners; and/or a LIDAR sensor may be located near the center of the rear bumper.

Each of the aforementioned sensors, alone or in combination with another sensor, may be used to implement various features of vehicle system 102. Examples of such features include, without limitation, blind spot detection, collision warning, and/or automated emergency braking.

Navigation sensors can include Global Positioning System (GPS) systems.

III. Blended Control

Figure 3:
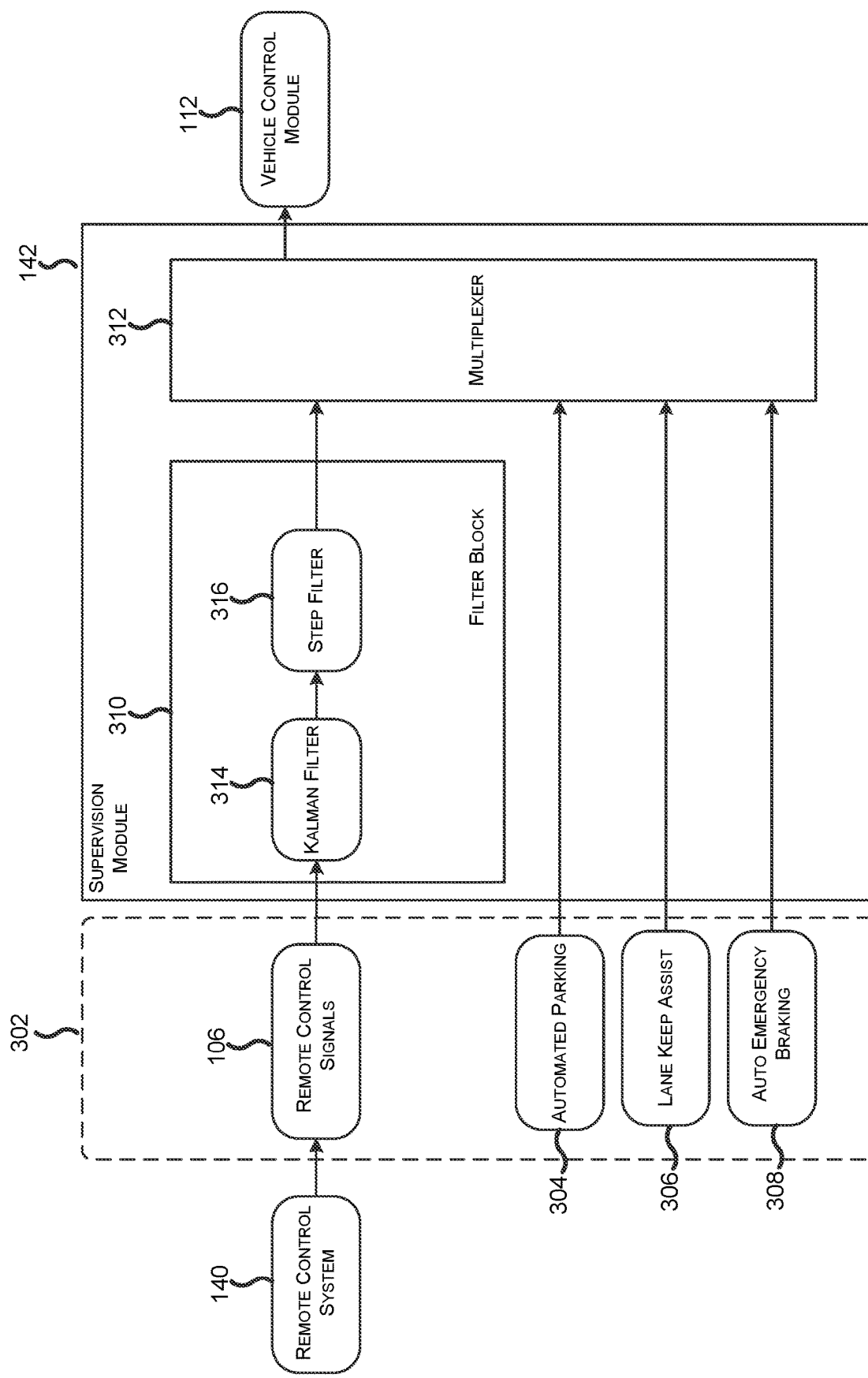
FIG. 3 illustrates a simplified block diagram of a system for blended control.

FIG. 3 illustrates a simplified block diagram of the operation of the supervision module 142 to provide blended control for remote vehicle operation, according to an embodiment of the present invention. The inputs to the supervision module 142 include a collection 302 of control signals coming from various sources. The collection 302 of signals may include remote control signals 106 (provided by a remote operator) from remote control system 140. The collection 302 of control signals may also include signals from components in the ADAS module 116, including an automated parking module 304, a lane keep assist module 306, and an auto emergency braking module 308.

The supervision module 142 may include a filter block 310 operable to smoothen or otherwise improve the remote control signals 106 received from the remote control system 140. Examples of the types of remote control signals 106 that may be processed by the filter block 310 in this manner include, for instance, steering angle, acceleration (e.g., throttle or other forms of power control), and brake value. The filter block 310 may comprise different types of filters, such as a Kalman filter 314 and a step filter 316. The Kalman filter 314 operates to predict the next value of a particular control signal based on a continually updated likelihood distribution of unknown variables that may contribute to errors in the signal. In each iteration, the predicted value is compared to with the actual value received (i.e., from the remote control system 140), and the likelihood distribution is updated. The Kalman filter 314 thus operates to reduce statistical noise and other inaccuracies in the control signal. For example, if the control input provides a current steering value of 5 degrees to the right of center and if the actual value received from the remote operator is 90 degrees to the right of center, there is a Kalman prediction error of 85 degrees in the calculation. The Kalman filter may calculate an average value of the control input based on historical control inputs. In this example, a 90 degree to the right of center control input may result in a filtered control input of only 60 degrees to the right of center. This filtered amount can be calculated based on the weights of measurements and prediction. In one embodiment, at least two remote control signals, i.e., the steering angle and acceleration control signals, are processed by the Kalman filter 314 in this manner. In this particular embodiment, the brake value received from the remote control system is not passed through the Kalman filter 314. The choice of which remote control signals are processed by particular filters such as the Kalman filter 314 may differ depending on implementation.

The step filter 316 operates to smooth out abrupt changes in the value of a parameter. A remote control signal that exhibits a large change in value over a short period of time may be processed by the step filter 316 to divide the change in value into smaller incremental steps and applied over a longer period of time, to achieve smoother operation. For example, instead of changing the steering value from 5 degrees right of center to 60 degrees right of center instantly, the step filter 316 can incrementally increase the steering 10 degrees at each point of time for smooth maneuvering rather than forwarding the 55 degrees delta instantly, to avoid sudden movements/accelerations. The step filter 316 may receive as input remote control signals that have been processed by the Kalman filter 316, as well as remote control signals that have bypassed the Kalman filter 316.

As shown, the supervision module 142 may also include a multiplexer 312 for combining various control signals, including (1) the filtered remote control signals obtained from the output of the filter block 310 and (2) various control signals from ADAS modules such as the automated parking module 304, the lane keep assist module 306, and the auto emergency braking module 308. In one embodiment, the multiplexer 312 is a device that selects one of several input signals and provides the selected input signal as an output signal The output of multiplex 312 is then sent as an electrical or optical signal to the vehicle control module 112. The vehicle control module 112 commands actuation of control components, such as steering, accelerator, and brakes.

The logic for determining which control input the multiplexer 312 selects at any given time may be based on certain rules and priorities. In one embodiment, the following rules are applied:

A: Whenever there is an availability of automated driving technology, the vehicle will notify the remote operator. For example, if lane keeping assistance 306 is available, a remote operator can receive a notification in the remote control system 140 (e.g., a cockpit) from the vehicle for availability of lane keeping assistance 306.

B The remote operator can decide whether to engage the system or not by accepting or rejecting the request by pressing a button. As an example, remote operator can engage the lane keeping assistance 306 feature or not with a press of a button.

C: The remote operator can always override/disengage other assist systems (lane keeping assistance 306 or Automated parking 304, etc.) anytime except in safety critical scenarios in which the automatic emergency braking (AEB) module 308 is applied.

D: If vehicle detects a hazard and enables the automated emergency braking 308, the remote operator will get a notification that brake applied by automated emergency braking 308 module. The remote operator can take control of the vehicle from the automated emergency braking 308 module after making sure the hazard is removed.

In addition, the selection of a particular control signal by the multiplexer 312 at any given time may also depend on the prioritization assigned to various controls. In one embodiment, the following prioritization may be applied (lowest number indicating the highest priority): (1) Automated Emergency Braking 308; (2) Manual driver inputs received via manual control inputs installed in the vehicle (3) remote operator input received from the remote control module 140 through the remote computer system 106; and (4) lane keeping assistance and Automated Parking Features received from the ADAS Module 116 as shown in FIG. 1. Other priorities are considered and may be possible.

IV. Composite Mapping

As mentioned above, vehicle system 102 may comprise different types of sensors that generate signals to provide sensor information (e.g., raw and/or processed data) relating to vehicle system 102 and/or its surroundings. The sensor information may be communicated to remote computer system 106, where data processing and feature extraction may be performed based on deep learning models. In some embodiments, at least some of the sensor information may be combined to generate a composite mapping of an environment external to vehicle system 102. The composite mapping may be provided to vehicle control module 112 for internal use and/or presented to a user via a graphical user interface.

In certain embodiments, at least some of the sensor data is communicated to a remote computer system (e.g., remote computer system 106), where data processing and feature extraction is performed. The data processing and feature extraction performed by the remote computer system can be based on different data analysis models, such as deep learning models. In certain embodiments, at least some of the sensor data may be combined (e.g., through sensor fusion) to generate a composite mapping or other visual representation of an environment external to the vehicle. The visual representation or data for generating the visual representation may be sent from vehicle system 102 to remote computer system 106 to enable the remote computer system 106 to display the visual representation to the remote operator.

Figure 4:
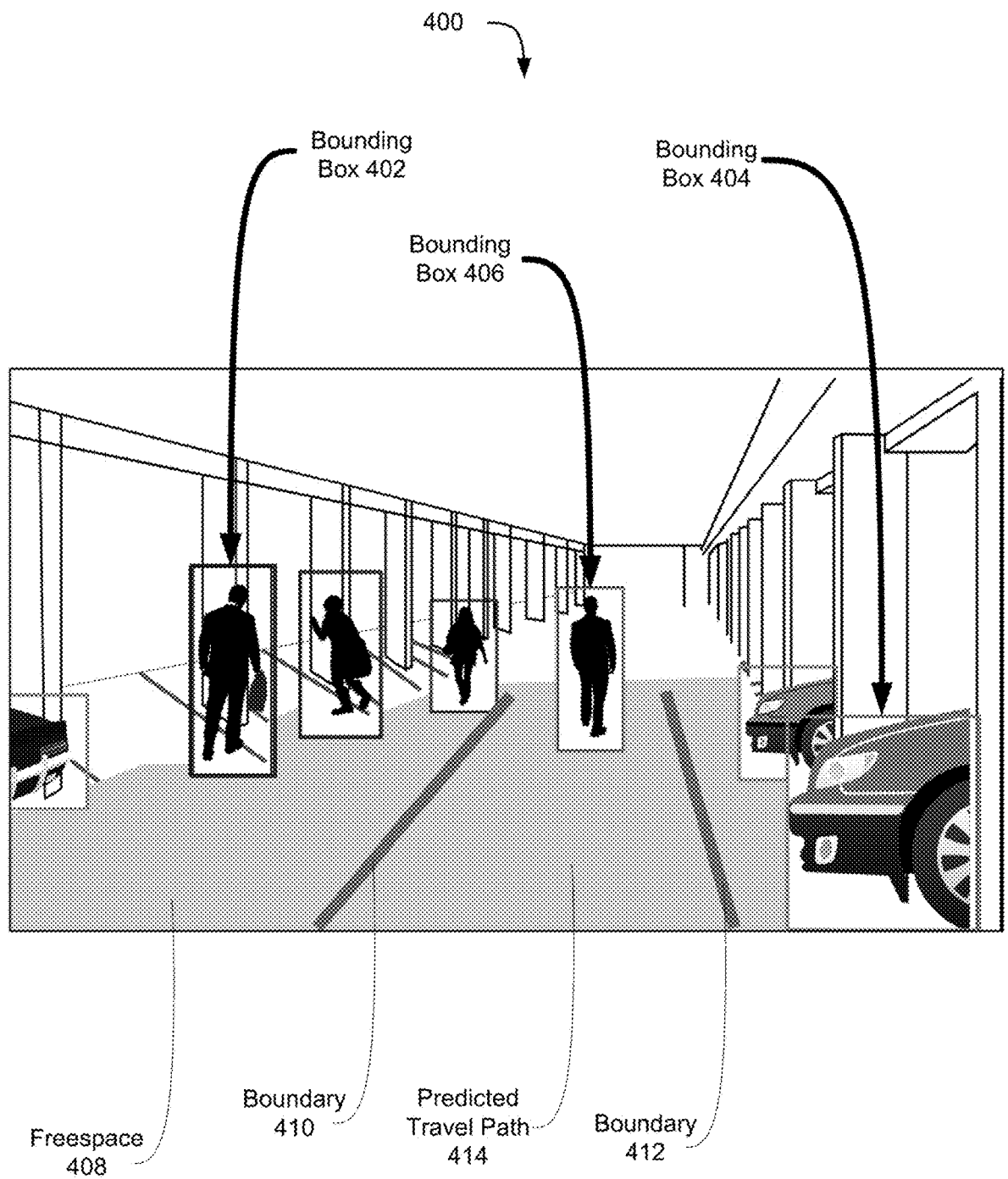
FIG. 4 illustrates an example composite mapping comprising data aggregated from a plurality of sensors.

FIG. 4 illustrates an example of such a composite mapping 400 comprising data from different types of sensors. In the example of FIG. 4, the sensors may include cameras, a steering angle sensor, a LIDAR sensor, and radar sensors.

Based on the information provided by various sensors, composite mapping 400 may include indications of detected objects (e.g., pedestrians, other vehicles, and/or concrete pylons) in an environment external to vehicle system 102. For example, such objects may be flagged, highlighted, or otherwise marked to draw a user's attention. Referring to FIG. 4, detected objects are flagged using multi-dimensional (e.g., two-dimensional or three-dimensional) bounding boxes 402, 404, and 406, which are included in an augmented reality overlay on camera data. Different types of objects may be marked using a different color. For example, bounding box 402 may be blue to indicate detection of a pedestrian, whereas bounding box 404 may be green to indicate detection of a car. Although not shown in FIG. 4, in some embodiments, each bounding box may be labeled with information, such as an object identifier (e.g., "Pedestrian" or "Car") and a distance (e.g., "38 inches" or "156 centimeters") from vehicle system 102.

Additionally or alternatively, composite mapping 400 may include an indication of a multi-dimensional (e.g., two-dimensional or three-dimensional) region in which vehicle system 102 can be maneuvered. Referring to FIG. 4, such a region is referred to as freespace 408, which includes an area unobstructed by objects.

Additionally or alternatively, composite mapping 400 may include an indication of a predicted travel path 414 for vehicle system 102 shown in FIG. 1. Referring to FIG. 4, predicted travel path 414 may be delineated as a region between boundaries 410, 412. Predicted travel path 414 may be determined based on data from one or more sensors (e.g., a steering angle sensor and/or a motion sensor). In the example of FIG. 4, predicted travel path 414 is illustrated as a straight path. However, it should be appreciated that predicted travel path 414 could alternatively be a curved path.

In some embodiments, composite mapping 400 may include audiovisual warnings relating to objects detected in predicted travel path 414. For example, the pedestrian detected in predicted travel path 414 may be flagged, highlighted, or otherwise marked using a particular color and/or animation (e.g., flashing labels). To illustrate, bounding box 406 may be red and labeled with the phrase "Warning!"

V. Remote Control System

Figure 5:
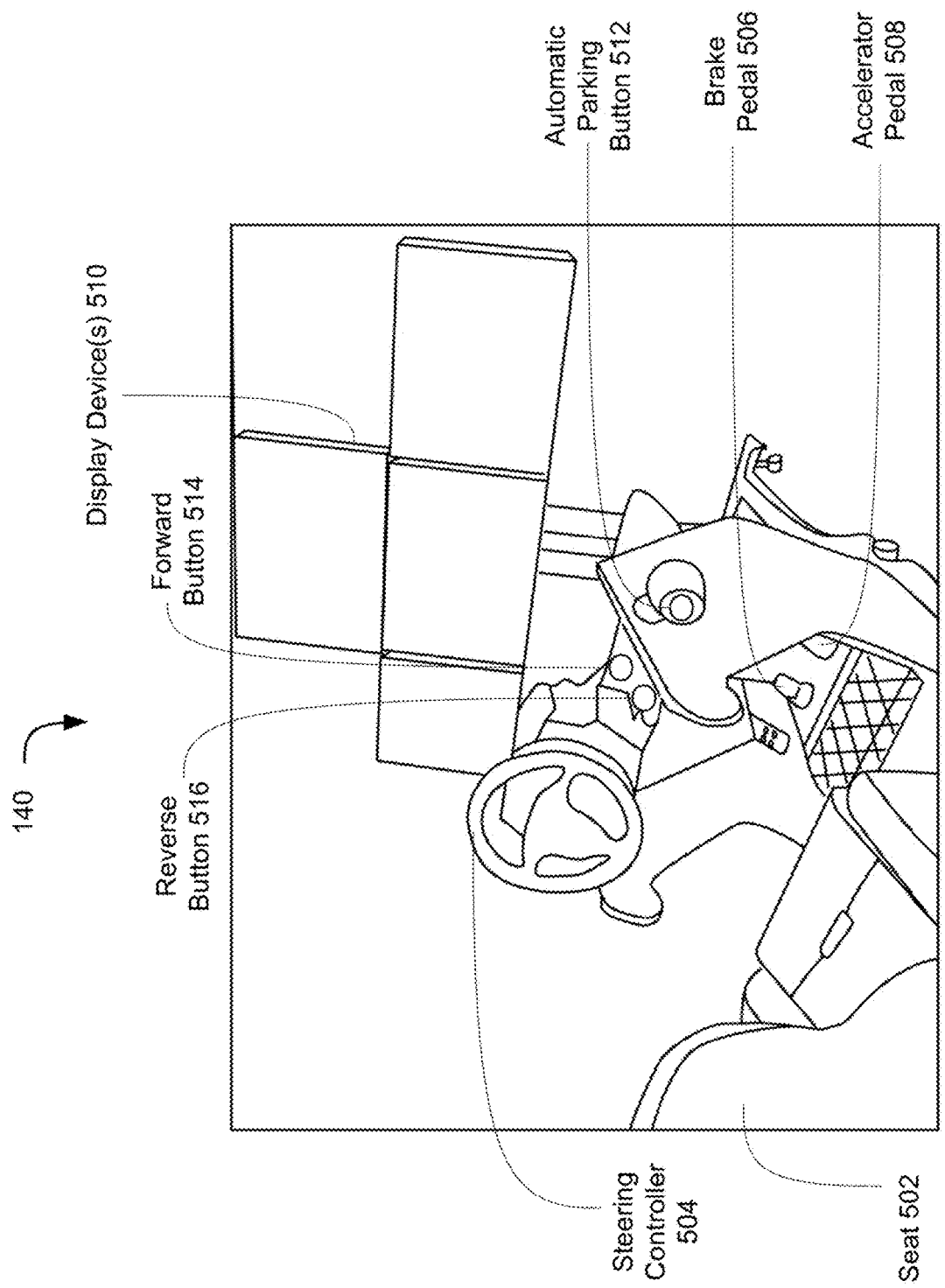
FIG. 5 illustrates an example teleoperation system.

FIG. 5 illustrates an example remote control system 140 in accordance with some embodiments. In the example of FIG. 5, remote control system 140 enables a user (e.g., a remote operator) to remotely operate vehicle system 102. In some automated driving conditions, a remote operator may be better at responding to a multitude of often-unpredictable situations than a fully automated remote control system 140.

Referring to FIG. 5, remote control system 140 comprises a configuration of components including one or more display devices 510, a seat 502, a steering controller 504, a brake pedal 506, an accelerator pedal 508, an automatic parking button 512, a forward button 514, and a reverse button 516. In other embodiments, the remote control system 140 can include one or more computer pointing devices (e.g., mice, trackballs, joysticks, touchpads, and light pens) to provide steering command inputs. In some embodiments, the remote operator can control the forward and rearward movement of the vehicle through a switch or lever. In other embodiments, the remote operator can control the commanded speed of the remote vehicle through any of a lever, a dial, a slider switch, a keyboard entry, and movement of a mouse scroll wheel. It should be appreciated that FIG. 5 is merely provided as an example and that other configurations (e.g., configurations comprising components not illustrated in FIG. 5) are contemplated to be within the scope of the disclosure. For example, one or more components may be omitted from FIG. 5, placed at another location in FIG. 5, consolidated with another component illustrated in FIG. 5, and/or added to FIG. 5 without departing from the scope of the disclosure or the spirit of the appended claims.

Display device(s) 510 may be used to present sensor information relating to the driving environment to a remote operator. For example, each display device illustrated in FIG. 5 may be used to present a composite mapping incorporating the perspective of a different camera. Although FIG. 5 illustrates display device(s) 510 as an upside-down "T" configuration of four flat screens, it should be appreciated that other configurations are also contemplated to be within the scope of the disclosure. For example, in some embodiments, display device(s) 510 may comprise a single curved screen that presents a composite mapping incorporating a 360-degree view stitched together from multiple cameras. In some embodiments, the display device(s) 510 may be a head mounted display that a remote operator can wear.

A remote operator may view display device(s) 510 from a cockpit comprising seat 502 and a plurality of devices that enable remote operation of vehicle system 102 responsive to sensor information (e.g., audiovisual data) presented via display device(s) 510. Each device of the plurality of devices may be capable of generating a signal that causes vehicle system 102 to perform one or more operations. For example, steering controller 504 may generate a signal for causing vehicle system 102 to make a turn; brake pedal 506 may generate a signal for causing vehicle system 102 to slow or stop; accelerator pedal 508 may generate a signal for causing vehicle system 102 to increase its speed; automatic parking button 512 may generate a signal for initiating an automatic parking feature of vehicle system 102; a forward buttons 514, and a reverse button 516 may generate signals for controlling the transmission system of vehicle system 102.

VI. Process Overview

Figure 6A:
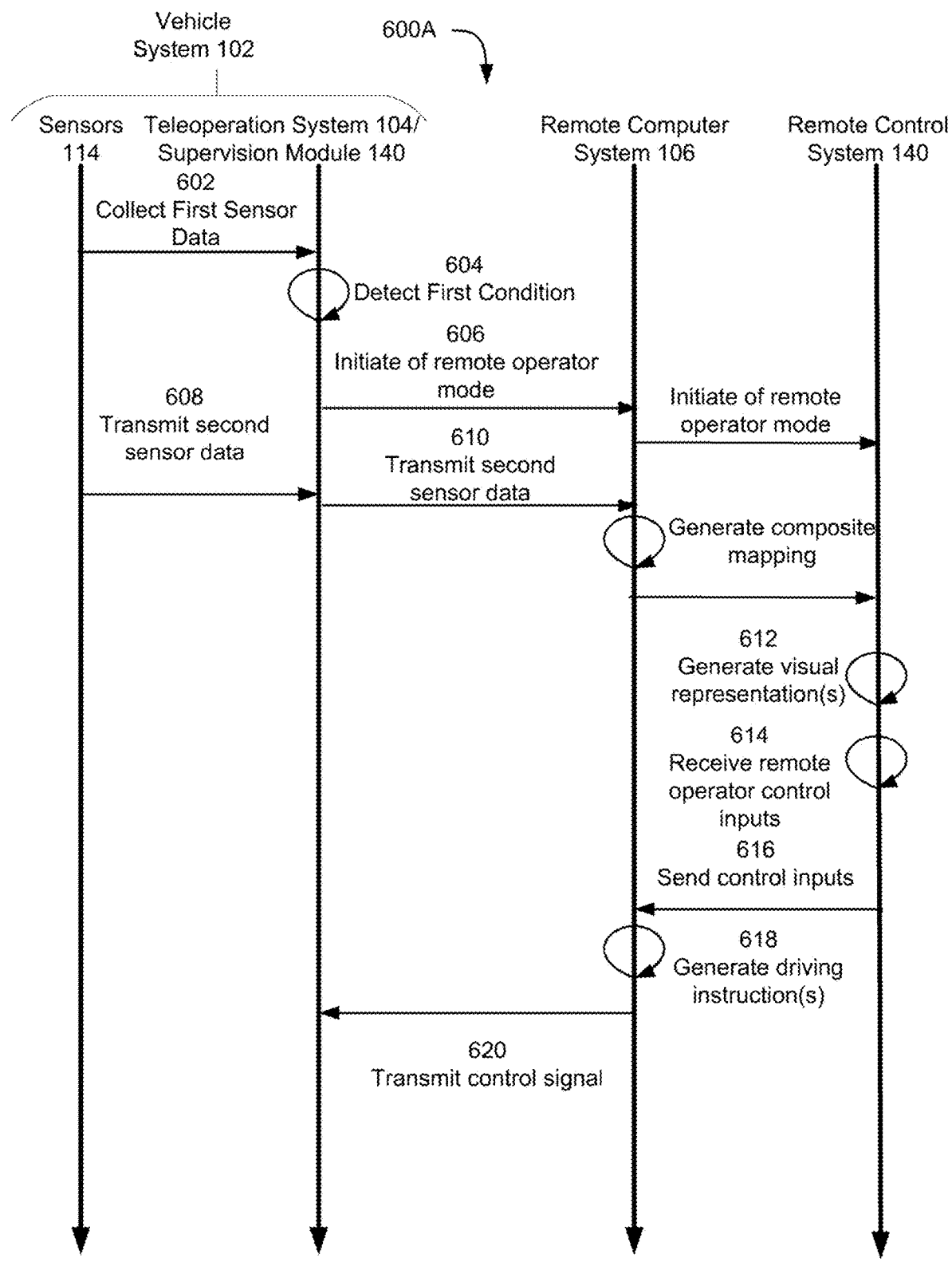
FIGS. 6A-B illustrate an example process for blending a control signal for remote operation.
Figure 6B:
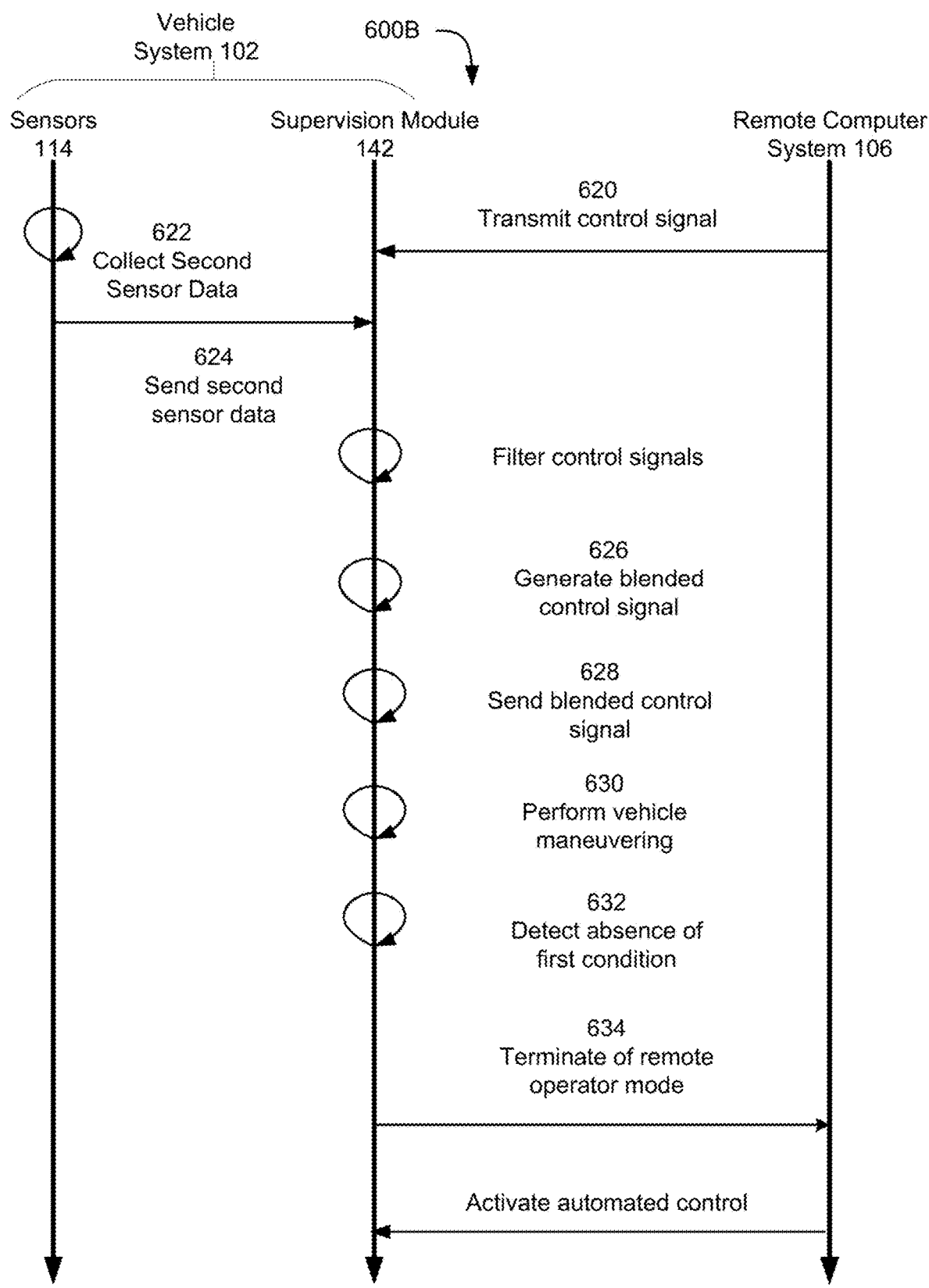

FIGS. 6A-B illustrate example processes 600A and 600B, collectively referred to herein as "process 600," for blending a control signal for remote vehicle operation. Although FIGS. 6A-B illustrate process 600 in a particular order, it should be appreciated that different orders are also contemplated to be within the scope of the disclosure. For example, one or more elements may be omitted from process 600, performed in parallel with another element of process 600, and/or added to process 600 without departing from the scope of the disclosure or the spirit of the appended claims.

FIG. 6A illustrates process 600A for generating blended control for remote operations. Process 600A illustrates interaction involving vehicle system 102, remote computer system 106, and remote control system 140. However, it should be appreciated that a different combination of systems is also contemplated to be within the scope of the disclosure. The vehicle system 102 can include sensors 114 and a teleoperation system 104. The teleoperation system 104 can include a supervision module 142 (shown in FIG. 1). For example, one or more systems may be omitted from FIG. 6A, consolidated with another system illustrated in FIG. 6A, and/or added to FIG. 6A without departing from the scope of the disclosure or the spirit of the appended claims.

At element 602, one or more systems collect first sensor data. The sensors 114 can include but are not limited to one or more cameras, one or more LIDARs, one or more radars, one or more ultrasonic sensors, and one or more navigation sensors. The sensors 114 can be distributed throughout the vehicle. The raw and/or processed data from the sensors 114 can send data to the teleoperation system 104 via wired or wireless connections. The sensor data can be stored in one or more memories of the teleoperation system. The sensor data can be stored as raw sensor data or stored as processed data. The raw or processed sensor data can be sent from the sensors 114 to the ADAS module 116 (as shown in FIG. 1).

At element 604, teleoperation system 104 detects a condition. In various embodiments, the condition can be detected from analysis of the first sensor data. The condition can be one or more sensor 114 failures that inhibits the ability of the autonomous vehicle on driving safely. The condition can also be an unknown or unexpected situation that the vehicle encounters that is beyond the scope for programmed responses. The condition can be due to changes in the road infrastructure or obstacles such as trees falling onto roadway, accidents, construction/work zones, law enforcement activities, weather related condition (e.g., road washout due to flooding), road/bridge damage due to earthquakes, or unsafe conditions (e.g., due to fires). For example, the condition can be a fallen tree in the roadway blocking lanes of travel. In these situations, the automated vehicle can receive sensor data from one or more sensors 114 (shown in FIG. 1) (e.g., camera and radar sensors) and determine the lack of available pre-programmed logic response. The teleoperation system 104 can generate a visual, auditory, or haptic response to inform the vehicle occupants of the situation. The teleoperation system 104 can transmit a message to the remote computer system 106 and the remote control system 140 to initiate remote operator mode. In some embodiments, one or more occupants of the automated vehicle can disable remote operation mode if the situation dictates.

When the automated vehicle confronts one of these edge cases, the automated vehicle can automatically call for a remote operator for assistance. In another embodiment, one of the occupants of the vehicle (if any) can initiate the request for remote operation. The remote operator can be located at remote operation center that can include one or more remote control systems 140. The remote operation center can be located at a facility that receives sufficient bandwidth and infrastructure to communicate with the automated vehicles. Prior to granting the vehicle control to the remote operator, the remote operator can access to all the data recorded in real-time by automated vehicle. The remote operator can observe the surrounding of the automated vehicle via video stream and three-dimensional visualization. This visual data helps the remote operator understand the scenario, the environment, and vehicle state. Using this information, the remote operator can manually drive the automated vehicle. Moreover, to decrease the variances of the steering movements between the automated vehicle and remote operation center, the remote control system 140 (shown in FIG. 1) can include haptic feedback and force feedback for the remote operator.

However, driving a vehicle through video stream and other three-dimensional visualization can be a complex task due to various factors, including but not limited to the limited amount of realistic feedback to the remote operator, the lack of perspective provided to the remote operator, a latency of remote computer system 106 between the automated vehicle and the remote control system 140, and a limited field of view provided by the remote control system 140 where the remote operator controls the automated vehicle. The limited number of display devices 510 as shown in FIG. 5, can be one of the reasons for limited field of view for the remote operator.

At element 606, the remote operation request can be communicated to remote computer system 106. For example, computing system 106 may comprise a plurality of computing devices including a computing device that handles the request. In some embodiments, handling the request may involve facilitating communication between teleoperation system 104 and the vehicle control module 112.

At element 608, second sensor data may be communicated from vehicle system 102 to remote computer system 106 via teleoperation system 104. The second sensor data can include visual information (e.g., camera data). The second sensor data can also include the position data (e.g., location of vehicle). The second sensor data can include speed of vehicle, steering angle, fuel level, battery charge level for electric/hybrid vehicles, turn signal status, and lights status. The second sensor data can also include an ultrasonic sensor, a radar sensor, and/or a LIDAR sensor. The transfer of the second sensor data can be achieved using a push and/or poll mechanism. For example, teleoperation system 104 may periodically poll teleoperation system 104 for sensor data and teleoperation system 104 may push sensor data to remote computer system 106.

In some embodiments, teleoperation system 104 may generate signals for communicating sensor data. This may involve converting signals generated at vehicle system 102 into a format that is compatible with software executing at remote computer system 106 and/or a format that is compliance with a communication protocol.

At element 610, the remote computer system 106 can generate a composite mapping responsive to receiving the second sensor data. The second sensor data may include data from one or more camera sensors, one or more non-camera sensors, such as a steering angle sensor, an ultrasonic sensor, a radar sensor, a velocity sensor, and/or a LIDAR sensor.

At element 610, the second sensor data can be communicated from the teleoperation system 104 to the remote computing system 106 in the remote control center. The remote computer system 106 can generate the composite mapping. The composite mapping can be sent to the remote control system 140 for generating the visual representations for display on the one or more displays 510 (shown in FIG. 5)

At element 612, the remote control system 140 can generate visual representations for a remote operator from the composite mapping. In some embodiments, the visual representations can be presented on one or more displays 510 (shown in FIG. 5). In some embodiments, the visual representations can be presented on a display of a head-mounted display that can be worn by a remote operator.

At element 614, remote control system 104 may receive one or more inputs from a remote operator for remotely maneuvering the automated vehicle. The one or more inputs can include one or more electrical or optical signals generated by controls manipulated by a remote operator. Embodiments of various remote operator controls are described for FIG. 5 above.

At element 616, the remote control system 140 can transmit the one or more inputs for remotely maneuvering the automated vehicle to the remote computer system 106. At the remote computer system 106, the one or more input signals will be converted to a control signal (e.g., a digital data packet) that can be recognized and utilized by the teleoperation system. For example, a remote operator moving the wheel 10 degrees to the right can be transmitted to an electrical value that corresponds that that control input.

At 618, the remote computer system 106 can convert the one or more inputs for remote maneuvering to generate driving instructions.

At 620, the remote computer system 106 transmits the control signal to the teleoperation system via a wireless network connection. If driving instructions are not aligned with the ADAS/AD function data, the driving instructions can be corrected or modified.

FIG. 6B illustrates process 600B for blending controls of an automated vehicle to result in a smoother safer experience. Process 600B illustrates interaction between the remote computer system 106 and the vehicle system 102. The vehicle system 102 can include the teleoperation system 104 and the sensors 114. The teleoperation system can include a supervision module 142. However, it should be appreciated that a different combination of systems is also contemplated to be within the scope of the disclosure. For example, one or more systems may be omitted from FIG. 6B, consolidated with another system illustrated in FIG. 6B, and/or added to FIG. 6B without departing from the scope of the disclosure or the spirit of the appended claims.

Process 600B may follow process 600A.

The supervision module 142, part of the teleoperation system 104, can receive the sensor data from the sensors 114 and control signals from the remote computer system 106 via the teleoperation system 104. The supervision module 142 can determine if one or more preset vehicle limits will be exceeded through implementation of the remote operator commands. The supervision module 142 can also detect a series of control commands, often in opposite directions as a result of remote operator induced oscillations from remote operator control. The supervision module 142 can reduce the commanded inputs to increase or reduce the overcorrections, thus dampening any oscillations.

In some embodiments the change may be a predetermined percentage of the commanded input. For example, the supervision module detects a 30 degree right turn commanded by the remote controller and determines that this much turn at the vehicle's current speed (e.g., 60 miles per hour) would be unsafe. The supervision module 142 can reduce the commanded steering wheel angle based on a safe amount for the vehicle speed.

In some embodiments, the supervision module 142 can determine that the vehicle is not maintaining proper clearance along the sides of the vehicle. The supervision module 142 can command control inputs to clear obstacles or maintain proper position in the center of the lane.

In some embodiments, the supervision module 142 can detect imminent collision. Upon detecting potential collision, the supervision module 142 can initiate actions (e.g., emergency braking) to avoid collision or turn to avoid obstacles.

At element 620, the signals generated at remote computer system 106 can be communicated to the supervisor module 142 via the teleoperation system 104. The teleoperation system 104 can generate signals for causing vehicle system 102 to perform maneuvering. Generating these signals may comprise converting the signals received from remote computer system 106 into a format that is compatible with vehicle system 102. If the driving instructions are aligned with the ADAS/AD function data, the driving instructions can be sent to the control electrical control unit.

At element 622, second sensor data can be collected. Sensors 114 can provide the second sensor data that can include but is not limited to information from one or more cameras, one or more LIDARs, one or more radars, one or more ultrasonic sensors, and one or more navigation sensors. The sensor data can be stored in one or more memories of the teleoperation system 104.

At element 624, the second sensor data can be sent from the sensors 114 to the teleoperation system 104 for analysis. All or a portion of the sensor data can be sent.

At element 626, the supervision module 142 can generate a blended control signal for controlling at least one operation affecting a trajectory of the vehicle. The blended control can be signals based on the one or more second signals from the remote operator and the second received sensor information.

In some embodiments, the supervision module 142 can detect a first commanded speed level by the one or more second signals. The generating the blended control signal can include comparing the first commanded speed level to the received sensor information. The technique can include detecting a second commanded speed level by the one or more second signals. The generation of the blended control signal can include adjusting the second commanded speed level to reduce fluctuations between the first commanded speed level and the second commanded speed level.

In some embodiments, the generating the blended control signals can include detecting a steering angle commanded by the one or more second signals. The generating the blended control signal can include comparing the commanded steering angle to a present steering angle and a vehicle velocity from the received sensor information. The generating the blended control signal can include adjusting the commanded steering angle to maintain a steady trajectory.

In some embodiments, the generating the blended control signal can include detecting a distance from one or more obstacles in a vicinity of the vehicle. The generating the blended control signal can include generating one or more steering commands, one or more acceleration commands, and one or more braking commands, to maintain a set distance from the one or more obstacles. The generating the blended control signal can include transmitting, the one or more steering commands, the one or more acceleration commands, and the one or more braking commands to the vehicle control module.

In some embodiments, the generating the blended control signal can include detecting a distance from a second vehicle within a set distance of the vehicle. The generating the blended control signal can include generating one or more acceleration commands, and one or more braking commands, to maintain a minimum distance from the second vehicle. The generating the blended control signal can include transmitting the one or more acceleration commands and the one or more braking commands to the vehicle control module.

In some embodiments, the generating the blended control signal can include detecting one or more of an object, a person or a second vehicle that enters a projected path of the vehicle. The generating the blended control signal can include defining available free space around the vehicle and boundaries around the object, the person, or the second vehicle. The generating the blended control signal can include generating one or more steering commands, one or more acceleration commands, and one or more braking commands, to cause the vehicle to maneuver into the free space around the vehicle and outside the boundaries around the object, the person, or the second vehicle. The generating the blended control signal can include sending, the one or more steering commands, the one or more acceleration commands, and the one or more braking commands to the vehicle control module.

At 628, the teleoperation system 104 can send the blended control signal to the vehicle control module 112 (shown in FIG. 1). Specifically, the blended control signal can be received by the electronic control units (ECUs) of the vehicle control module 112.

At 630, the vehicle can perform maneuvers as commanded by the blended control signal. In some embodiments, the maneuvering can be to steer the vehicle to travel along a route via one or more programmed waypoints. In some embodiments, the vehicle can increase or decrease velocity. In some embodiments, the vehicle can maneuver to maintain the center of a lane. In some embodiments, the vehicle may maneuver to provide increase spacing on one side of the vehicle or another. In some embodiments, the vehicle may maneuver to avoid collision. In some embodiments, the vehicle may perform an emergency braking.

At 632, the teleoperation system 104 detects an absence of the condition. The condition necessitated the remote vehicle operations mode. For example, the vehicle may have cleared the obstacle, roadwork, or emergency vehicles. After a predetermined amount of time after detecting the first detection no longer persists, the vehicle can return to automated driving mode.

At 634, in some embodiments, a signal is sent to the remote computer system 106 that the condition is clear. In some embodiments, the remote operator needs to execute a command to return the vehicle to automated driving mode. In some embodiments, an occupant of the vehicle can select an option to return the vehicle to an automated driving mode. In some embodiments, the system can automatically return to an automated driving mode after the condition has cleared and the remote operator does not cancel.

Figure 7:
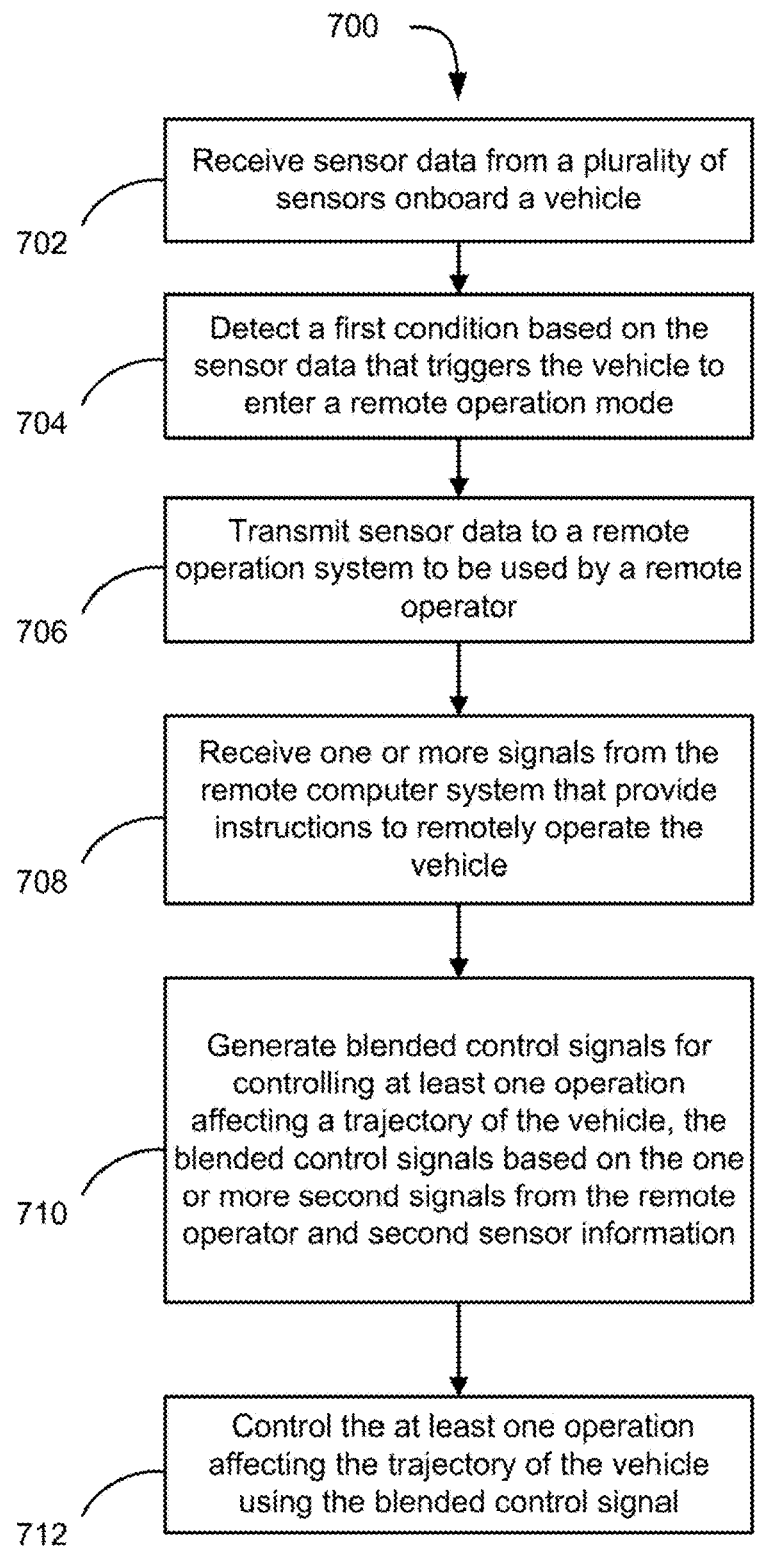
FIG. 7 illustrates a simplified flowchart of a method for blended remote vehicle operations in accordance with certain embodiments.

FIG. 7 is a flowchart of a method 700 for blended control for remote vehicle operations in accordance with certain embodiments of the present disclosure. The method 700 involves steps similar to those discussed earlier in reference to the processes 600A and 600B. The method 700 can be used for blended control of a vehicle during remote vehicle operations. The method 700 can be performed by a vehicle computer system, e.g., the vehicle system 102.

At 702, the vehicle computer system collects sensor data from a plurality of sensors (e.g., the sensors 114) onboard the vehicle. As discussed earlier in reference to FIG. 2, various configurations of sensors are possible, and the vehicle can be equipped with one or more cameras, ultrasonic sensors, radar sensors, LIDAR sensors, motion sensors, etc. The sensor data may be collected into a single location (e.g., a memory accessed by teleoperation system 104). In some embodiments, sensor data may be sent from individual sensors to ECUs for processing before being collected. Sensor data can be collected in raw form. Sensor data can also be processed, (e.g., internally within the one or more sensors), by the ECUs, and/or the teleoperation system 104.

The collected sensor data can be processed through fusion of the sensor data to generate data associated with one or more visual representations of the surrounding environment. The processing of the sensor data can be performed by teleoperation system 104 (e.g., using mapping logic 122) and/or elsewhere in the vehicle system 102 (e.g., by one or more ECUs). The fusion does not have to be performed using all of the collected sensor data. Instead, fusion can be performed using as little as sensor data from a first sensor (e.g., a camera) and sensor data from a second sensor (e.g., a second camera or a non-camera sensor). Thus, the data associated with a visual representation can be generated by fusing sensor data from a first sensor of the plurality of sensors with sensor data from at least a second sensor of the plurality of sensors. However, fusing data from additional sensors may provide a greater amount of information about the status of the vehicle and/or attributes of features in the surrounding environment.

The fusing of the sensor data may involve identifying one or more features of the surrounding environment. As discussed earlier in reference to mapping logic 122 in FIG. 1, identifying a feature may comprise detecting the presence of the feature in the surrounding environment and/or determining, based on the sensor data, one or more attributes of the detected feature. Detectable features include, but are not limited to, pedestrians, other vehicles, structural elements of a driving environment (e.g., walls, pylons, or support columns), parking space boundary markers, or direction arrows painted on the ground. The data associated with the visual representation may be indicative of detected features. For example, with regard to objects in the surrounding environment, the data associated with the visual representation can indicate attributes such as a distance of the object from the vehicle, a location of the object, a trajectory of the object, a speed of the object, a shape of the object, or a size of the object.

At 704, the teleoperation system 104 detects, based at least in part on the received first sensor information, a condition that triggers the vehicle to enter a remote operator mode. As previously stated the condition can be an unknown or unexpected situation that the vehicle encounters that is beyond the scope for programmed responses. The condition can be due to changes in the road infrastructure or obstacles such as trees falling onto roadway, accidents, construction/work zones, law enforcement activities, weather related condition (e.g., road washout due to flooding), road/bridge damage due to earthquakes, or unsafe conditions (e.g., due to fires). In these situations, the automated vehicle can receive sensor data from one or more sensors and determine the lack of available pre-programmed response. The teleoperation system 104 can generate a visual, auditory, or haptic response to inform the vehicle occupants of the situation. The teleoperation system 104 can transmit a message to the remote computer system 140 and the remote control system 106 to initiate remote operator mode. In some embodiments, one or more occupants of the vehicle can enable or disable remote operate mode if the situation dictates.

At 706, the teleoperation system 104 sends the sensor data to a remote computer system (e.g., remote computer system 106). The sensor data can include information for the visual representation(s). The remote computer system may process the data to output the visual representation(s) on one or more display devices viewed by a remote operator (e.g., using the display devices 510 depicted in FIG. 5). As discussed earlier, various types of visual representations are possible. For example, the visual representations may comprise a video or a reconstruction (e.g., a 3D reconstruction including a model representing the vehicle in spatial relation to objects in the surrounding environment). The video or reconstruction may include one or more graphical elements corresponding to objects and/or attributes determined in step 704. Examples of graphical elements include, but are not limited to, those depicted in FIG. 4 (e.g., an outline around an object, a silhouette of the object, or a graphical indication of the distance of the object from the vehicle).

At 708, the vehicle computer system receives one or more command signals from the remote computer system based on remote operator supplied in response to the visual representation(s). As explained earlier, the driving instructions may be instructions for longitudinal and/or lateral control of the vehicle. The visual representation(s) may be updated by repeating this process after receiving a driving instruction.

The teleoperation system 104 can collect second sensor data. Sensors 114 can provide the second sensor data that can include but is not limited to information from one or more cameras, one or more LIDAR's, one or more radars, one or more ultrasonic sensors, and one or more navigation sensors. The sensor data can be stored in one or more memories of the vehicle system 102 or one or more memories of the teleoperation system 104.

The second sensor data can be communicated from the vehicle system 102 to the teleoperation system 104 for analysis. All or a portion of the sensor data can be transmitted.

At 710, the supervision module 142, as shown in FIG. 1, can use the second sensor data to generate a blended control signal for controlling at least one operation affecting a trajectory of the vehicle. The blended control can be signals based on the one or more second signals from the remote operator and the second received sensor information.

At 712, the supervision module 142, as shown in FIG. 1, can control the at least one operation affecting the trajectory of the vehicle using the blended control signal.

In certain embodiments, the method 700 may include a step of monitoring a transmission speed of a wireless communication link between the vehicle computer system and the remote computer system. The vehicle computer system may switch from sending video data to sending data associated with a reconstruction (e.g., a 3D reconstruction) of the surrounding environment in response to determining that the transmission speed has dropped below a threshold.

In certain embodiments, the vehicle system may also be configured to perform automated emergency braking (e.g., using the automated braking feature) and/or configured to perform automatic speed reduction (e.g., through reducing acceleration, applying brakes, or a combination of both). Automated emergency braking could be performed in response to determining, by the vehicle system, that a driving instruction received from the remote computer system would cause the vehicle to collide with an object.

Automatic speed reduction could be performed in response to detecting, by the vehicle system, an interruption in the wireless communication link, which is used to send data associated with a visual representation to the remote computer system. The automatic speed reduction may reduce the speed at a certain rate (e.g., a rate set by an ECU) until the vehicle comes to a stop or until the wireless communication link becomes available again. The rate of speed reduction could be based on various factors such as the length of the interruption (e.g., gradually increasing the rate as the interruption continues over time, in order to safely reduce the speed and avoid a sudden stop), the current speed of the vehicle, and/or the distances to any nearby objects.

Automated emergency braking can be performed to prevent imminent collisions even when the vehicle is not being remotely operated. Therefore, automated emergency braking can be enabled whenever the vehicle is running or upon beginning remote operation of the vehicle. Automatic speed reduction can also be enabled to be available during remote operation (e.g., based on detecting that the wireless communication link has been established).

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. In addition, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. In addition, a number of steps may be undertaken before, during, or after the above elements are considered. Accordingly, the above description does not limit the scope of the disclosure.

The specification and drawings are, accordingly, to be regarded in an illustrative rather than a restrictive sense. However, it will be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by one or more computing devices, comprising:
    receiving, at a vehicle, first sensor information relating to a driving environment, the received first sensor information being based on first signals generated by a plurality of sensors coupled to the vehicle;
    detecting, at the vehicle, based at least in part on the received first sensor information, a condition that triggers the vehicle to enter a remote operation mode;
    transmitting, from the vehicle, a portion of the received first sensor information over a network to a remote operation system to be used by a remote operator;
    receiving, at a teleoperation system of the vehicle, one or more second signals from the remote operation system, the one or more second signals providing instructions from the remote operator to remotely operate the vehicle;
    receiving, at the teleoperation system, a plurality of signals from an advanced driver assistance system (ADAS) of the vehicle, the plurality of signals providing at least one additional instruction to operate the vehicle and including at least one of a control signal relating to automated parking, a control signal relating to lane keeping assistance, or a control signal relating to automated emergency braking;
    generating, by the teleoperation system, blended control signals for controlling at least one operation affecting a trajectory of the vehicle, wherein:
        the blended control signals are generated through adjusting the instructions from the remote operator based on second sensor information received at the vehicle,
        the second sensor information is based on updated signals generated by the plurality of sensors after the portion of the received first sensor information has been transmitted to the remote operation system, and
        the plurality of signals includes at least one signal generated by the ADAS based on the second sensor information;
    selecting, by the teleoperation system, an output signal from among the blended control signals and the plurality of signals from the ADAS, wherein the output signal is selected based on a predefined order of priority in which a first blended control signal, a first signal from the ADAS, and a second signal from the ADAS are each assigned a different priority level, and wherein the first blended control signal is assigned a priority level lower than that of the first signal from the ADAS but higher than that of the second signal from the ADAS; and
    sending, by the teleoperations system, the output signal to a vehicle control module that uses the output signal to control at least one operation affecting the trajectory of the vehicle.

2. The method of claim 1, wherein generating the blended control signals comprises:
    detecting a first commanded speed level by the one or more second signals;
    comparing the first commanded speed level to the received second sensor information;
    detecting a second commanded speed level by the one or more second signals, wherein the second commanded speed level is detected after the first commanded speed level and is different than the first commanded speed level; and
    adjusting the second commanded speed level to reduce fluctuations between the first commanded speed level and the second commanded speed level.

3. The method of claim 1, wherein generating the blended control signals comprises:
    detecting a commanded steering angle by the one or more second signals;
    comparing the commanded steering angle to a present steering angle and a vehicle velocity from the second sensor information; and
    adjusting the commanded steering angle to maintain a steady trajectory.

4. The method of claim 1, wherein generating the blended control signals comprises:
    detecting a distance from one or more obstacles in a vicinity of the vehicle; and generating one or more steering commands, one or more acceleration commands, and one or more braking commands, to maintain a set distance from the one or more obstacles.

5. The method of claim 1, wherein generating the blended control signals comprises:
   detecting a distance from a second vehicle within a set distance of the vehicle; and
   generating one or more acceleration commands, and one or more braking commands, to maintain a minimum distance from the second vehicle.

6. The method of claim 1, wherein generating the blended control signals comprises:
   detecting one or more of an object, a person or a second vehicle that enters a projected path of the vehicle;
   defining available free space around the vehicle and boundaries around the object, the person or the second vehicle; and
   generating one or more steering commands, one or more acceleration commands, and one or more braking commands, to cause the vehicle to maneuver into the available free space around the vehicle and outside the boundaries around the object, the person, or the second vehicle.

7. The method of claim 1, further comprising engaging automated driving mode after the condition has not been detected for a predetermined period of time.

8. The method of claim 1, wherein the first signal from the ADAS relates to automated emergency braking, and wherein the second signal from the ADAS relates to automated parking or lane keeping assistance.

9. One or more computing devices configured to:
   receive, at a vehicle, first sensor information relating to a driving environment, the received first sensor information being based on first signals generated by a plurality of sensors coupled to the vehicle;
   detect, at the vehicle, based at least in part on the received first sensor information, a condition that triggers the vehicle to enter a remote operation mode;
   transmit, from the vehicle, a portion of the received first sensor information over a network to a remote operation system to be used by a remote operator;
   receive, at a teleoperation system of the vehicle, one or more second signals from the remote operation system, the one or more second signals providing instructions from the remote operator to remotely operate the vehicle;
   receive, at the teleoperation system, a plurality of signals from an advanced driver assistance system (ADAS) of the vehicle, the plurality of signals providing at least one additional instruction to operate the vehicle and including at least one of a control signal relating to automated parking, a control signal relating to lane keeping assistance, or a control signal relating to automated emergency braking;
   generate, by the teleoperation system, blended control signals for controlling at least one operation affecting a trajectory of the vehicle, wherein:
      the blended control signals are generated through adjusting the instructions from the remote operator based on second sensor information received at the vehicle,
      the second sensor information is based on updated signals generated by the plurality of sensors after the portion of the received first sensor information has been transmitted to the remote operation system, and
      the plurality of signals includes at least one signal generated by the ADAS based on the second sensor information;
   select an output signal from among the blended control signals and the plurality of signals from the ADAS, wherein the output signal is selected based on a predefined order of priority in which a first blended control signal, a first signal from the ADAS, and a second signal from the ADAS are each assigned a different priority level, and wherein the first blended control signal is assigned a priority level lower than that of the first signal from the ADAS but higher than that of the second signal from the ADAS; and
   use the output signal to control the at least one operation affecting the trajectory of the vehicle.

10. The one or more computing devices of claim 9, wherein generating the blended control signals comprises:
    detecting a first commanded speed level by the one or more second signals;
    comparing the first commanded speed level to the received second sensor information;
    detecting a second commanded speed level by the one or more second signals, wherein the second commanded speed level is detected after the first commanded speed level and is different than the first commanded speed level; and
    adjusting the second commanded speed level to reduce fluctuations between the first commanded speed level and the second commanded speed level.

11. The one or more computing devices of claim 9, wherein generating the blended control signals comprises:
    detecting a commanded steering angle by the one or more second signals;
    comparing the commanded steering angle to a present steering angle and a vehicle velocity from the received second sensor information; and
    adjusting the commanded steering angle to maintain a steady trajectory.

12. The one or more computing devices of claim 9, wherein generating the blended control signals comprises:
    detecting a distance from one or more obstacles in a vicinity of the vehicle; and
    generating one or more steering commands, one or more acceleration commands, and one or more braking commands, to maintain a set distance from the one or more obstacles.

13. The one or more computing devices of claim 9, wherein generating the blended control signals comprises:
    detecting a distance from a second vehicle within a set distance of the vehicle; and
    generating one or more acceleration commands, and one or more braking commands, to maintain a minimum distance from the second vehicle.

14. The one or more computing devices of claim 9, wherein generating the blended control signals comprises:
    detecting one or more of an object, a person or a second vehicle that enters a projected path of the vehicle;
    defining available free space around the vehicle and boundaries around the object, the person or the second vehicle; and
    generating one or more steering commands, one or more acceleration commands, and one or more braking commands, to cause the vehicle to maneuver into the available free space around the vehicle and outside the boundaries around the object, the person, or the second vehicle.

15. The one or more computing devices of claim 9, further configured to engaging automated driving mode after the condition has not been detected for a predetermined period of time.

16. The one or more computing devices of claim 9, wherein the first signal from the ADAS relates to automated emergency braking, and wherein the second signal from the ADAS relates to automated parking or lane keeping assistance.

17. A computer-readable storage medium containing instructions that, when executed by one or more processors, cause:

receiving, at a vehicle, first sensor information relating to a driving environment, the received first sensor information being based on first signals generated by a plurality of sensors coupled to the vehicle;

detecting, at the vehicle, based at least in part on the received first sensor information, a condition that triggers the vehicle to enter a remote operation mode;

transmitting, from the vehicle, a portion of the received first sensor information over a network to a remote operation system to be used by a remote operator;

receiving, at a teleoperation system of the vehicle, one or more second signals from the remote operation system, the one or more second signals providing instructions from the remote operator to remotely operate the vehicle;

receiving, at the teleoperation system, a plurality of signals from an advanced driver assistance system (ADAS) of the vehicle, the plurality of signals providing at least one additional instruction to operate the vehicle and including at least one of a control signal relating to automated parking, a control signal relating to lane keeping assistance, or a control signal relating to automated emergency braking;

generating, by the teleoperation system, blended control signals for controlling at least one operation affecting a trajectory of the vehicle, wherein:

the blended control signals are generated through adjusting the instructions from the remote operator based on second sensor information received at the vehicle, the second sensor information is based on updated signals generated by the plurality of sensors after the portion of the received first sensor information has been transmitted to the remote operation system, and the plurality of signals includes at least one signal generated by the ADAS based on the second sensor information;

selecting an output signal from among the blended control signals and the plurality of signals from the ADAS, wherein the output signal is selected based on a predefined order of priority in which a first blended control signal, a first signal from the ADAS, and a second signal from the ADAS are each assigned a different priority level, and wherein the first blended control signal is assigned a priority level lower than that of the first signal from the ADAS but higher than that of the second signal from the ADAS; and using the output signal to control the at least one operation affecting the trajectory of the vehicle.

18. The computer-readable storage medium of claim 17, wherein the first signal from the ADAS relates to automated emergency braking, and wherein the second signal from the ADAS relates to automated parking or lane keeping assistance.

* * * * *